United States Patent [19]

Hill et al.

[11] 4,063,454

[45] Dec. 20, 1977

[54] FIELD TEST ASSEMBLY FOR MEASURING COMPRESSIVE LOADS

[75] Inventors: Terrance E. Hill, Columbus; George R. Riley, Grove City, both of Ohio

[73] Assignee: The United States of America as represented by the Secretary of the Army, Washington, D.C.

[21] Appl. No.: 739,180

[22] Filed: Nov. 5, 1976

[51] Int. Cl.² ............................................. G01L 1/22
[52] U.S. Cl. ........................................... 73/141 A
[58] Field of Search .............. 73/1 B, 88 F, 94, 141 A

[56] References Cited

U.S. PATENT DOCUMENTS

| | | | |
|---|---|---|---|
| 2,472,047 | 5/1949 | Ruge | 73/141 A |
| 2,873,341 | 2/1959 | Kutsay | 73/88.5 R X |
| 3,545,919 | 12/1970 | Aronson et al. | 73/41 G X |
| 3,757,568 | 9/1973 | Fletcher et al. | 73/94 |

*Primary Examiner*—Charles A. Ruehl
*Attorney, Agent, or Firm*—Nathan Edelberg

[57] ABSTRACT

A test assembly for measuring compressive loading under actual field conditions having a standard Strainsert stud strain transducer attached at each end to a piston-like member and mounted within a tubular housing. By mounting one piston-like member to a support shaft and the other piston-like member to the object supported, compressive loads, such as from the wind, can be accurately measured.

1 Claim, 1 Drawing Figure

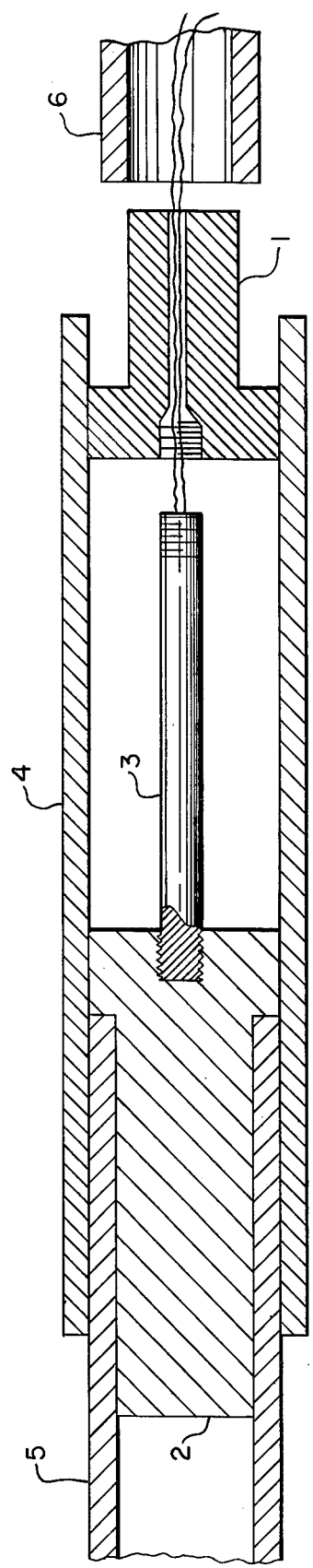

FIELD TEST ASSEMBLY FOR MEASURING COMPRESSIVE LOADS

GOVERNMENT RIGHTS

The invention described herein may be manufactured, used, and licensed by or for the Government for Governmental purposes without the payment to me of any royalties thereon.

BACKGROUND OF THE INVENTION

1. Field of the Invention

The invention relates to a compression test assembly for measuring loading under actual field conditions.

2. Description of the Art

In the prior art, compression test equipment has consisted of strain gauges and loads cells designed primarily for use in testing specimens under laboratory conditions. Adaptation of these devices to testing of components under actual field conditions is difficult, and produces a cumbersome and expensive test arrangement that is frequently rendered inoperative due to the load sensing equipment being destroyed under the rigors of the tested system's operating conditions.

SUMMARY OF THE INVENTION

The above noted disadvantages, as well as other defects of the prior art, are solved by applicants' invention which is primarily concerned with providing a simple test assembly that can withstand the rigors of an operational test. The assembly of this invention utilizes any conventional strain transducer bolt, such as is normally used for detecting tensile loading, by adapting it to receive compressive loading through use of a housing and piston arrangement. The preferred embodiment as disclosed is particularly suited for testing the compressive load applied to supporting struts and to objects supported upon such struts.

BRIEF DESCRIPTION OF THE DRAWING

The sole FIGURE of the drawing is a sectional view in partially exploded form of a preferred embodiment test assembly according to the invention.

DETAILED DESCRIPTION OF THE INVENTION

The compression test assembly according to the invention as shown in the FIGURE comprises a piston 1 and a piston-shaped support plug 2 into which any standard Strainsert stud strain transducer 3 is threadedly mounted, and about which is placed a housing 4. The housing 4 provides a coupling between the elements and permits relative axial movement between piston 1 and support plug 2 while preventing buckling of the transducer due to bending moments. Each of the elements 1, 2 have ends of reduced diameter onto which the supporting shaft 5 and supported object 6 are mounted. A load applied to object 6 will be transferred to transducer 3 which produces a signal that is a function of the strain.

The compression test assembly of the present invention as described above presents a simple means for measuring the compressive load applied to a structure under actual conditions of usage such as wind loads upon shaft supported structures. The test assembly is easily installed and removed without the use of special techniques while being less costly and subject to damage as prior art compression measuring devices. Strain measurement signals from transducer 3 can be monitored by any conventional readout device.

We claim:
1. A compression test assembly comprising:
   a. a stud type strain transducer;
   b. a support plug attached to one end of said transducer;
   c. a piston member attached to the other end of said stud type strain transducer; and
   d. a housing surrounding said plug and said piston in a mannner that permits relative axial movement between said piston and said plug;

wherein said plug has an end of reduced cross-section for receiving an end of a support pole and said housing has an axial opening adapted to overlay said plug and said pole.

* * * * *